United States Patent [19]

Shimokubo et al.

[11] Patent Number: 5,477,776
[45] Date of Patent: Dec. 26, 1995

[54] SHAFT SUPPORTING MECHANISM FOR MIXING AND KNEADING DEVICE

[75] Inventors: Hironobu Shimokubo; Atsunori Zensai, both of Daito, Japan

[73] Assignee: Funai Electric Co., Ltd., Japan

[21] Appl. No.: 429,780

[22] Filed: Apr. 27, 1995

[30] Foreign Application Priority Data

Apr. 27, 1994 [JP] Japan .................... 6-112130

[51] Int. Cl.⁶ .............. A21D 2/00; A21D 8/00; A47J 27/00; A47J 37/00
[52] U.S. Cl. .................. 99/348; 99/468; 366/98; 366/146; 366/314
[58] Field of Search ................... 99/327, 329 R, 99/331, 332, 348, 352, 467, 468, 483; 366/144–146, 149, 96, 69, 98, 205, 314, 343, 601

[56] References Cited

U.S. PATENT DOCUMENTS

| | | | |
|---|---|---|---|
| 4,903,588 | 2/1990 | Horiuchi et al. | 99/468 |
| 4,921,174 | 5/1990 | Okada et al. | 366/314 |
| 4,951,559 | 8/1990 | Arao et al. | 366/98 |
| 4,957,040 | 9/1990 | Nakakura et al. | 99/348 |
| 5,076,153 | 12/1991 | Takahashi et al. | 99/468 |
| 5,297,475 | 3/1994 | Borger et al. | 366/314 |
| 5,351,606 | 10/1994 | Matsuzaki | 366/98 |
| 5,364,183 | 11/1994 | Shibata | 366/314 |
| 5,386,763 | 2/1995 | Chen | 99/348 |
| 5,402,710 | 4/1995 | Chen | 99/348 |
| 5,410,949 | 5/1995 | Yung | 99/468 |
| 5,415,081 | 5/1995 | Yoshida et al. | 99/348 |

*Primary Examiner*—Timothy F. Simone
*Attorney, Agent, or Firm*—Bacon & Thomas

[57] ABSTRACT

A shaft supporting mechanism for a mixing and kneading device including a shaft which is driven by a motor, a mixing and kneading blade having an insertion hole which is to be inserted into the shaft. The shaft has a D cut surface formed thereon, and at the end of the D cut surface, a sloped corner facet consisting of edge portions each having an inclination is formed. On the other hand, the mixing and kneading blade has a plane abutment surface formed as a portion of the inner wall of the insertion hole. The mixing and kneading blade is inserted into the shaft in such a manner that the abutment surface is meshed with the D cut surface, to rotate the mixing and kneading blade while the shaft is rotated by the motor.

4 Claims, 4 Drawing Sheets

SHAFT SUPPORTING MECHANISM FOR MIXING AND KNEADING DEVICE

BACKGROUND OF THE INVENTION

The invention relates to a shaft supporting mechanism for a mixing and kneading device in which a mixing and kneading blade is releasably arranged. In particular, the invention is directed to a shaft supporting mechanism for a mixing and kneading device of a domestically used bread making machine that bakes bread after preparing dough while pouring bread making ingredients into a bread baking case and mixing and kneading the ingredients therein, and then fermenting the prepared dough.

A conventional bread making machine for home use is usually designed so that ingredients such as flour, water, and yeast are poured into a bread baking case arranged inside a closed container; dough is prepared by mixing and kneading the ingredients in the case; the dough is subjected to first fermentation and second fermentation; and the fermented dough is finally baked. The mixing and kneading operation is performed by stirring the bread making ingredients such as flour, water, and yeast with a mixing and kneading blade provided on the bottom of the bread baking case.

The shaft supporting mechanism for the mixing and kneading device in such a conventional bread making machine or the like will be described below.

The conventional shaft supporting mechanism for the mixing and kneading device is constructed of a D cut shaft, which is a rotating shaft. The mixing and kneading blade having an insertion hole is inserted into the D cut shaft. FIG. 8 is a perspective view of such a rotating shaft.

In FIG. 8, the rotating shaft is shown as a D cut shaft 30 whose diameter is d1. The D cut is formed by cutting a part of a circumferential portion at an end portion of a round rod-like shaft. An axially extending D cut plane surface 30a is provided. The section of a shaft portion on which the D cut is arranged is therefore D-shaped with a part thereof arcuately removed. Here, reference character 30m designates the upper end surface of the D cut shaft 30.

FIG. 5 is a side view of the mixing and kneading blade that is to be inserted into the D cut shaft 30; FIG. 6 is a diagram as viewed from A in FIG. 5 (a top view); and FIG. 7 is a diagram as viewed from B of FIG. 5.

In FIGS. 5 to 7, a mixing and kneading blade 14 is formed of a shaft portion 14a and a blade portion integrally with a synthetic resin, the blade radially extending from the shaft portion 14a. The blade 14 rotates in an α direction around the shaft portion 14a. The blade portion, having inclined surfaces 14d and 14e, is formed into plate-like sloped surfaces so that the bread making ingredients can be pushed up frontward in the α direction. The inclined surface 14d has a large inclination as shown in FIG. 7.

The shaft portion 14a has an axially extending insertion hole 14b. The insertion hole 14b has a diameter d2, which is a value slightly larger than the diameter d1 of the D cut shaft 30. The section of the insertion hole 14b is a circle with a part thereof arcuately removed. It is a plane abutment surface 14c, that is equivalent to a chord subtending the arcuately removed portion.

The D cut shaft 30 is inserted into the insertion hole 14b of the mixing and kneading blade 14 so as to mesh the D cut surface 30a with the abutment surface 14c. With the diameter d2 of the insertion hole 14b being slightly larger than the diameter d1 of the D cut shaft 30, the mixing and kneading blade 14 is releasable from the shaft 30. This arrangement allows the mixing and kneading blade 14 to be taken out together and simultaneously with the dough or the bread after the mixing and kneading process or after the whole bread making process so that the dough or the bread will not be damaged.

FIG. 9 shows, through a two-dotted chain line, the section of the insertion hole 14b of the mixing and kneading blade 14, the section being taken along the upper end surface 30m of the D cut shaft 30 immediately before rotation. Since the insertion hole 14b is slightly larger than the outer diameter of the D cut shaft 30, a gap 31 is provided between these components as shown in FIG. 9 immediately before the rotation of the shaft.

Then, when the D cut shaft 30 is rotated in the α direction by the rotating means coupled to the D cut shaft 30, a point M on the upper end surface 30m of the D cut shaft 30 abuts against the abutment surface 14c of the mixing and kneading blade 14 as schematically shown in FIG. 9, thereby biasing the abutment surface 14c. As a result of the abutment surface 14c having been biased, the mixing and kneading blade 14 is rotated in the α direction.

When the thus constructed mixing and kneading blade 14 is rotated on the bottom of the bread baking case, the poured bread making ingredients come in contact with the inclined surfaces 14d and 14e in rotation. Since the inclined surfaces 14d and 14e are inclined, the bread making ingredients are pushed upward while coming in contact with the inclined surfaces. As a result of this operation, the bread making ingredients are mixed and stirred with respect to the bread baking base, and this contributes to uniformly mixing and kneading the bread making ingredients.

By the way, when the viscosity of the bread making ingredients is increased with the gluten in the flour becoming sticky while the mixing and kneading process is being progressed, the bread making ingredients come to make a complicated motion. Thus, the mixing and kneading blade 14 may, in some cases, be released from the D cut shaft 30. For example, the volume of the bread making ingredients under the inclined surfaces 14d and 14e is increased, so that a force for pushing up the inclined surfaces 14d and 14e is easily generated. If such an upwardly pushing force is produced, the insertion hole 14b of the mixing and kneading blade 14 is pushed up to the upper part of the D cut shaft 30, not only making the mixing and kneading operation unstable but also making it likely to release the mixing and kneading blade 14 from the D cut shaft 30 in an extreme case.

Since the diameter d2 of the insertion hole 14b is slightly larger than the diameter d1 of the D cut shaft 30 for the aforementioned reason, the mixing and kneading blade 14 is quite likely to come off the D cut shaft 30 in the conventional example, which has been a problem.

SUMMARY OF THE INVENTION

The object of the invention is, therefore, to provide a shaft supporting mechanism for a mixing and kneading device capable of preventing the mixing and kneading blade from being released during the mixing and kneading process.

To achieve the above object, the invention provides a shaft supporting mechanism for a mixing and kneading device, including: a shaft having a D cut surface and a sloped corner facet formed at the end of the D cut surface, the sloped corner facet consisting of edge portions each having an inclination; and a mixing and kneading blade having a blade portion extending in a radial direction from a shaft portion thereof, and an insertion hole passing through the shaft portion in an axial direction, a part of an inner wall of the insertion hole being a plane abutment surface, wherein the insertion hole of the mixing and kneading blade is inserted into the shaft in such a manner that the abutment surface is meshed with the D cut surface, to rotate the mixing and kneading blade while the shaft is rotated.

DETAILED DESCRIPTION OF THE PREFERRED EMBODIMENT

An embodiment of the invention will now be described with reference to the accompanying drawings.

Figure 1:
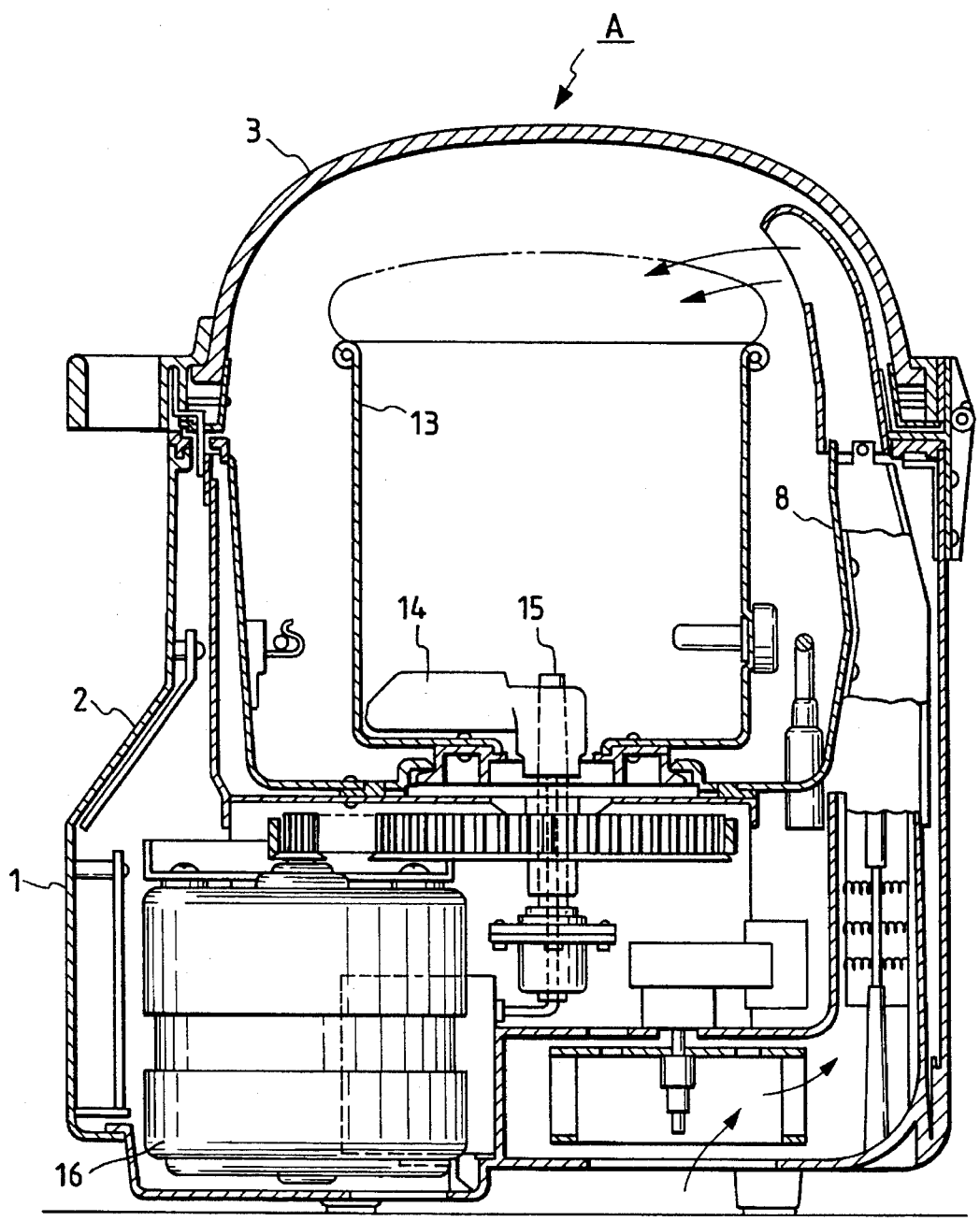
FIG. 1 is a sectional view of a bread making machine having a shaft supporting mechanism for a mixing and kneading device incorporated thereinto, the shaft supporting mechanism being an embodiment of the invention.
Figure 2:
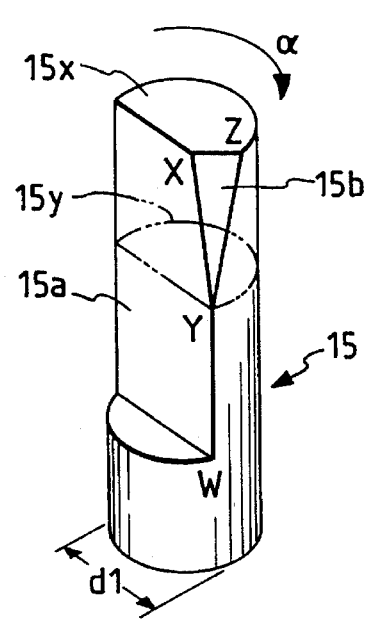
FIG. 2 is a perspective view showing the main portion of the shaft supporting mechanism for the mixing and kneading device, which is the embodiment of the invention.
Figure 3A:
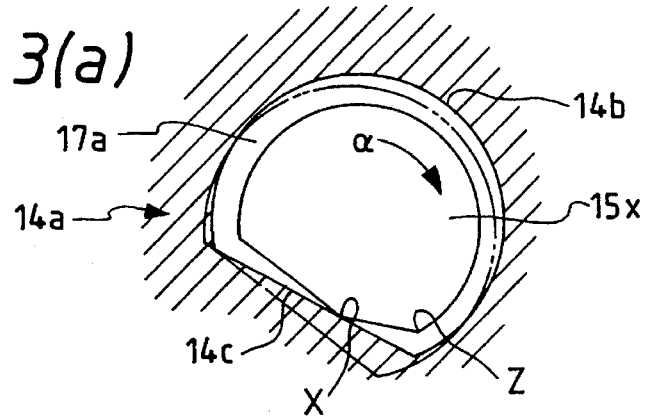
FIGS. 3(a) and 3(b) are schematic diagrams, each showing the operation of the shaft supporting mechanism shown in FIG. 2.
Figure 3B:
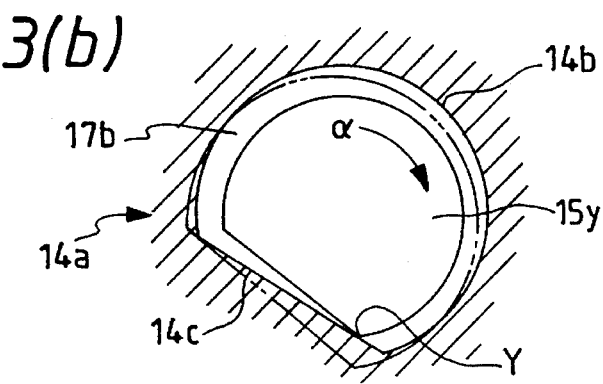

FIG. 1 is a sectional view of a bread making machine into which a shaft supporting mechanism for a mixing and kneading device thereof, which is the embodiment of the invention, is incorporated; FIG. 2 is a perspective view showing the main portion of the shaft supporting mechanism for the mixing and kneading device of the invention; and FIGS. 3(a) and 3(b) are schematic diagrams showing a mixing and kneading blade that has been inserted into the shaft supporting mechanism shown in FIG. 2.

Figure 4:
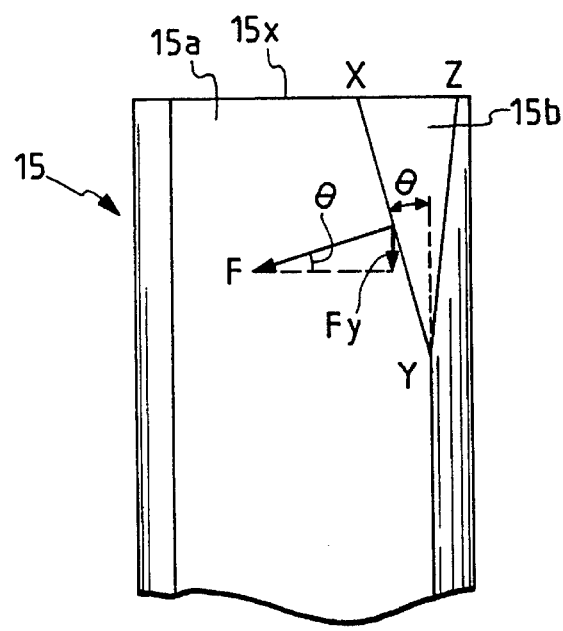
FIG. 4 is a diagram illustrative of how the shaft supporting mechanism shown in FIG. 2 is operated.

In addition, FIG. 4 is a diagram illustrative of how the shaft supporting mechanism shown in FIG. 2 is operated. It may be noted that the same or like parts as those of the above-described conventional example are designated by the same reference numerals and their description will be omitted.

In FIG. 2, the shaft supporting mechanism for the mixing and kneading device of the invention is constructed of a shaft 15 whose diameter is d1. The shaft 15 has an axially extending D cut plane surface 15a with a circumferential portion of a round rod at an end portion partially cut.

Figure 5:
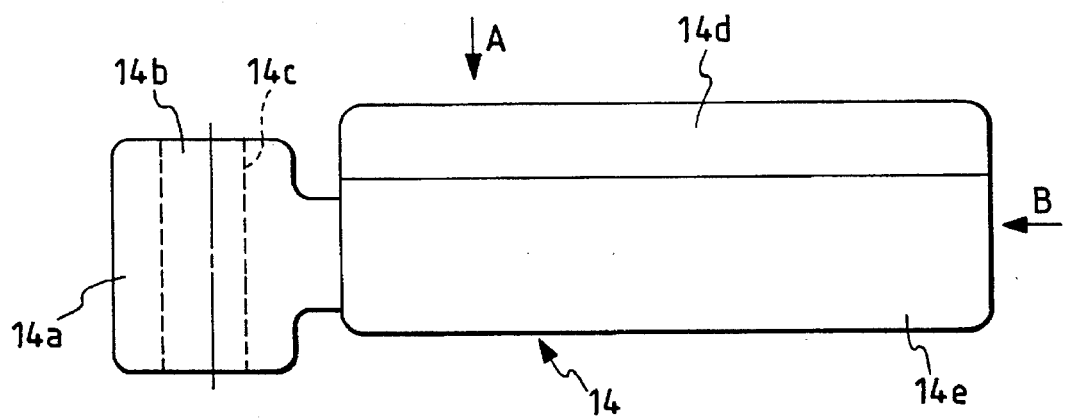
FIG. 5 is a side view of a mixing and kneading blade that is inserted into the shaft supporting mechanism shown in FIG. 2.
Figure 6:
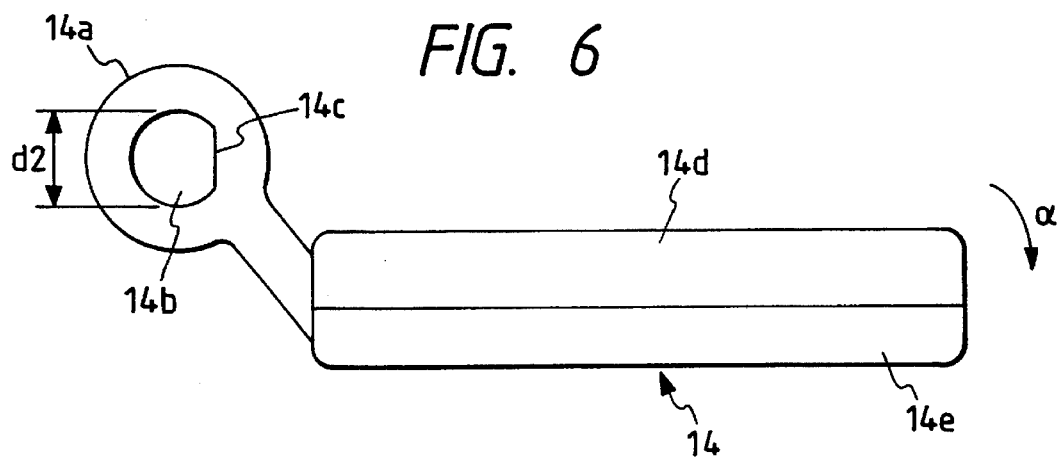
FIG. 6 is diagram as viewed from A in FIG. 5.
Figure 7:
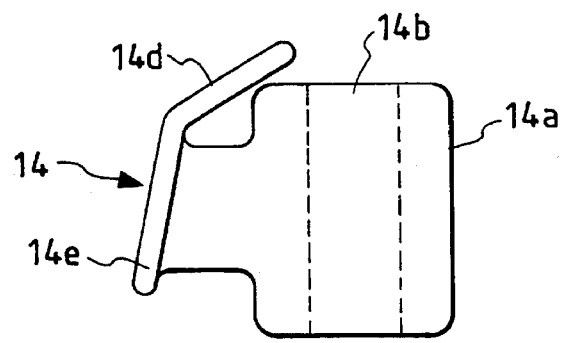
FIG. 7 is a diagram as viewed from B in FIG. 5.
Figure 8:
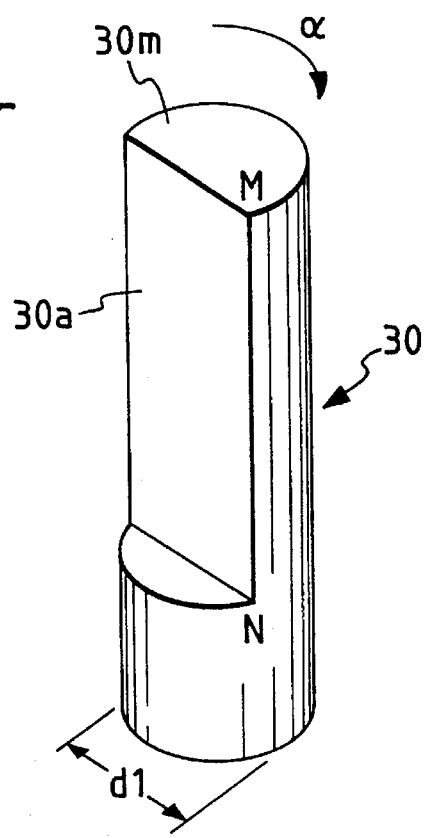
FIG. 8 is a perspective view of a conventional shaft supporting mechanism.
Figure 9:
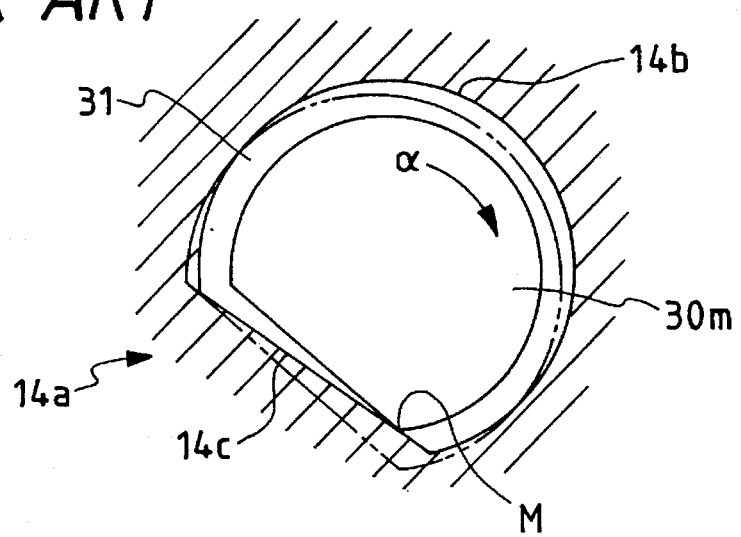
FIG. 9 is a schematic diagram showing the operation of the shaft supporting mechanism shown in FIG. 8.

At the end of the shaft 15 that has the D cut surface 15a formed thereon is a sloped corner facet 15b. The corner facet 15b consists of edge portions XY, XZ, and YZ, each portion having an inclination. The thus constructed shaft 15 is inserted into an insertion hole 14b of a mixing and kneading blade 14 shown in FIGS. 5 to 7 as to mesh an abutment surface 14c with the D cut surface 15a. It may be noted here that reference character 15x designates a top surface of the shaft 15; and 15y designates a sectional surface which passes the point Y and which is perpendicular to the axis of the shaft 15. The sectional surface 15y is indicated by a two-dotted chain line in FIG. 2.

The operation of the shaft supporting mechanism will be described based on a bread making machine shown in FIG. 1 into which the shaft supporting mechanism is incorporated.

In FIG. 1, a bread making machine A has a cylindrical baking oven main body 1. The baking oven main body 1 has not only an operation panel 2 for selecting baking times and conditions in the middle front thereof but also a dome-like opening and closing cover 3 on top thereof. Inside the baking oven main body 1 are a cylindrical inner case 8 and a cylindrical bread baking case 13. The bread baking case 13 is used also as a mixing and kneading container.

The mixing and kneading blade 14 for mixing and kneading bread making ingredients poured into the bread baking case 13 is rotatably inserted into the shaft 15 that stands up from the bottom of the bread baking case 13. The rotation of a motor 16 is transmitted to the shaft 15.

At the time of making bread, the bread baking case 13, into which predetermined bread making ingredients are poured, is closed with the cover 3. When a switch on the operation panel 2 has been turned on, the mixing and kneading blade 14 is driven to rotate, and this starts the mixing and kneading process in which the bread making ingredients are mixed and kneaded to prepare a dough. Upon completion of the mixing and kneading process, the fermentation process for the dough is started, and when the fermentation process has been ended, the baking process is then started.

FIG. 3(a) shows, through a two-dotted chain line, the section of the insertion hole 14b of the mixing and kneading blade 14 at the position of the top end surface 15x of the shaft 15 before the start of the mixing and kneading process, i.e., immediately before the motor 16 is rotated. Since the insertion hole 14b is slightly larger than the outer diameter of the shaft 15 as described above, a gap 17a is provided between the shaft 15 and the insertion hole 14b as shown in FIG. 3(a) before the rotation of the motor 16.

Further, FIG. 3(b) shows, through a two-dotted chain line, the section of the insertion hole 14b of the mixing and kneading blade 14 at the position of the section 15y of the shaft 15 shown in FIG. 2 before the rotation of the motor 16. Similarly to FIG. 3(a), a gap 17b is provided between the outer side of the shaft 15 and the inner side of the insertion hole 14b as shown in FIG. 3(b) before the rotation of the motor 16.

If it is assumed that the mixing and kneading process is started and the motor 16 is then rotated, the shaft 15 is also rotated along with the motor 16 in an α direction shown in FIG. 2. As a result, the shaft supporting mechanism is operated as schematically shown in FIGS. 3(a) and 3(b).

That is, on the section at the position of the top end surface 15x of the shaft 15 shown in FIG. 3(a), the point X of the shaft 15 comes in contact with the abutment surface 14c of the insertion hole 14b, so that at the point X the rotational force is imparted to the mixing and kneading blade 14 in the α direction.

On the other hand, on the section at the position of the section 15y of the shaft 15 shown in FIG. 3(b), the point Y of the shaft 15 comes in contact with the abutment surface 14c of the insertion hole 14b, so that at the point Y the rotational force is imparted to the mixing and kneading blade 14 in the α direction.

If the shaft 15 is rotated under such a condition, it is apparent that the mixing and kneading blade 14 is biased in the α direction on the line XY because the position at which the shaft 15 is abutted against the abutment surface 14c is on the edge portion XY as shown in the diagram in FIG. 4 which is illustrative of how the shaft supporting mechanism is operated. Since the edge portion XY is inclined by θ, the shaft 15 comes to impart a biasing force F to the abutment surface 14c of the mixing and kneading blade 14 through the line of the edge portion XY along which the shaft 15 is abutted against the abutment surface 14c.

Since the biasing force F is inclined by θ, the biasing force F has a downward vector component Fy. The downward biasing force Fy is added to the abutment surface 14c, i.e., the shaft portion 14a of the mixing and kneading blade 14, so that the shaft portion 14a of the mixing and kneading blade 14 is biased downward.

That is, when the shaft 15 starts rotating in the α direction, the downward biasing force Fy is produced all the time to bias the shaft portion 14a of the mixing and kneading blade 14 downward. As a result, the mixing and kneading blade 14 is biased downward during the rotation thereof in the mixing and kneading process, thereby preventing the mixing and kneading blade 14 from being released from the shaft 15 effectively.

As described in the foregoing, the shaft supporting mechanism for the mixing and kneading device, which is the embodiment of the invention, is characterized as biasing the shaft portion of the mixing and kneading blade downward; i.e., an edge portion of the sloped facet provided at the upper corner of the D cut surface of the shaft, the edge portion having an inclination, is abutted against the abutment surface of the shaft portion of the mixing and kneading blade, thereby not only biasing the blade but also producing a biasing force component that is directed downward so as to correspond to the inclination; and the shaft portion of the mixing and kneading blade is biased downward. Hence, the invention contributes to providing the advantage of preventing the mixing and kneading blade from being released from the shaft during the mixing and kneading process.

What is claimed is:

1. A shaft supporting mechanism for a mixing and kneading device, comprising:

a shaft having a D cut surface and a sloped corner facet formed at the end of the D cut surface, said sloped corner facet consisting of edge portions each having an inclination; and a mixing and kneading blade having a blade portion extending in a radial direction from a shaft portion thereof, and an insertion hole passing through the shaft portion in an axial direction, a part of an inner wall of said insertion hole being a plane abutment surface, wherein said insertion hole of said mixing and kneading blade is inserted into said shaft in such a manner that the abutment surface is meshed with the D cut surface, to rotate said mixing and kneading blade while said shaft is rotated.

2. The shaft supporting mechanism for a mixing and kneading device according to claim 1, wherein a diameter of the insertion hole of said mixing and kneading blade is slightly larger than that of said shaft.

3. The shaft supporting mechanism for a mixing and kneading device according to claim 1, wherein the sloped corner facet of said shaft is formed in the shape of a triangle.

4. The shaft supporting mechanism for a mixing and kneading device according to claim 1, wherein said mixing and kneading device is of a bread making machine.

* * * * *